(12) United States Patent
Dror

(10) Patent No.: US 12,395,309 B2
(45) Date of Patent: Aug. 19, 2025

(54) TIMESTAMPING FOR MULTIPLE SYNCHRONIZATION DOMAINS IN A NETWORK DEVICE

(71) Applicant: Marvell Israel (M.I.S.L) Ltd., Yokneam (IL)

(72) Inventor: Nitzan Dror, Ramot Hashavim (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 18/594,822

(22) Filed: Mar. 4, 2024

(65) Prior Publication Data

US 2024/0204982 A1 Jun. 20, 2024

Related U.S. Application Data

(63) Continuation of application No. 17/879,587, filed on Aug. 2, 2022, now Pat. No. 11,924,318.

(Continued)

(51) Int. Cl.
*H04L 7/00* (2006.01)
*H04J 3/06* (2006.01)

(52) U.S. Cl.
CPC .......... *H04L 7/0033* (2013.01); *H04J 3/0685* (2013.01)

(58) Field of Classification Search
CPC ........ H04J 3/0661; H04J 3/0685; H04J 3/065; H04J 3/0667; H04J 3/0697; H04J 3/0658;
(Continued)

(56) References Cited

U.S. PATENT DOCUMENTS 7,773,606 B2 * 8/2010 Dobjelevski .......... H04J 3/0673
370/503
8,976,750 B1 3/2015 Pearson et al.
(Continued)

FOREIGN PATENT DOCUMENTS

CN 112887045 A 6/2021
DE 102008026391 A1 12/2009
(Continued)

OTHER PUBLICATIONS

"LAN8814—4-Port Gigabit Ethernet Transceiver with QSGMII/Q-USGMII, IEEE 1588, SyncE and TSN Support," Microchip Technology Inc., 108 pages, Feb. 1, 2022.
(Continued)

*Primary Examiner* — Peter Chen

(57) ABSTRACT

A physical layer (PHY) processor of a network device receives a timing message via an external network and generates a first timestamp using a first local-domain clock used by the PHY processor. The PHY processor transfers the timing message and the first timestamp to a packet processor of the network device via an internal communication link. The packet processor generates a second timestamp for the timing message using a domain-specific clock. The packet processor determines a delay value using the first timestamp, the delay value accounting for a time delay corresponding to the transfer of the timing message within the network device from the PHY processor to the packet processor. The packet processor adjusts the second timestamp using the delay value to generate an adjusted domain-specific timestamp for the timing message.

26 Claims, 5 Drawing Sheets

Related U.S. Application Data

(60) Provisional application No. 63/313,292, filed on Feb. 24, 2022.

(58) Field of Classification Search
CPC ... H04L 7/0033; H04L 7/0037; H04L 7/0041; H04L 7/0016; G06F 1/04; G06F 1/06; G06F 1/12
See application file for complete search history.

(56) References Cited

U.S. PATENT DOCUMENTS

| | | |
|---|---|---|
| 9,356,721 B2 | 5/2016 | Haulin |
| 9,391,728 B2 | 7/2016 | Haulin |
| 9,929,928 B1 | 3/2018 | Dekoos |
| 10,084,559 B1 | 9/2018 | Devineni et al. |
| 11,924,318 B2 | 3/2024 | Dror |
| 2002/0039370 A1 | 4/2002 | Elliot |
| 2003/0235216 A1 | 12/2003 | Gustin |
| 2004/0008973 A1 | 1/2004 | Marshall et al. |
| 2004/0141526 A1 | 7/2004 | Balasubramanian et al. |
| 2005/0286507 A1 | 12/2005 | Oesterling et al. |
| 2006/0164902 A1 | 7/2006 | Fung |
| 2007/0260906 A1 | 11/2007 | Corredoura |
| 2009/0310729 A1 | 12/2009 | Liu et al. |
| 2010/0162265 A1 | 6/2010 | Heddes |
| 2011/0228768 A1 | 9/2011 | Gelter et al. |
| 2012/0014377 A1 | 1/2012 | Joergensen et al. |
| 2013/0003757 A1 | 1/2013 | Boatright et al. |
| 2013/0208735 A1 | 8/2013 | Mizrahi et al. |
| 2013/0343409 A1 | 12/2013 | Haulin |
| 2014/0092918 A1 | 4/2014 | Jost |
| 2014/0153588 A1 | 6/2014 | Haulin |
| 2015/0333856 A1 | 11/2015 | Hayter et al. |
| 2016/0142329 A1 | 5/2016 | Sasak et al. |
| 2016/0294536 A1 | 10/2016 | Biederman |
| 2018/0343183 A1* | 11/2018 | Pope .................. G06F 13/1689 |
| 2021/0297230 A1 | 9/2021 | Dror et al. |
| 2023/0006807 A1* | 1/2023 | Hubbe .................. H04J 3/0667 |

FOREIGN PATENT DOCUMENTS

| | | |
|---|---|---|
| EP | 2254267 A1 | 11/2010 |
| EP | 3840255 A1 | 6/2021 |
| WO | 2012065823 A1 | 5/2012 |
| WO | 2013117997 A2 | 8/2013 |
| WO | 2016070947 A1 | 5/2016 |

OTHER PUBLICATIONS

Non-Final Office Action for U.S. Appl. No. 17/828,938 mailed on May 25, 2023 (10 pages).

* cited by examiner

TIMESTAMPING FOR MULTIPLE SYNCHRONIZATION DOMAINS IN A NETWORK DEVICE

CROSS REFERENCES TO RELATED APPLICATIONS

This application is a continuation of U.S. patent application Ser. No. 17/879,587 (now U.S. Pat. No. 11,924,318), entitled "Timestamping for Multiple Synchronization Domains in a Network Device," filed on Aug. 2, 2022, which claims the benefit of U.S. Provisional Patent App. No. 63/313,292, entitled "Multi Time Domain Timestamping via Only Single PHY TAI Interface," filed on Feb. 24, 2022. Both of the applications referenced above are hereby incorporated by reference in their entireties.

FIELD OF TECHNOLOGY

The present disclosure relates generally to communication networks, and more particularly to timestamping packets in a network device with multiple synchronization domains.

BACKGROUND

Clock synchronization protocols are commonly used in packet-based networks to synchronize clocks maintained at different network devices. In such clock synchronization protocols, a first network device, which maintains a master clock, otherwise referred to herein as a source clock, transmits a timing packet including a transmit timestamp generated based on a source clock time to a second network device, which maintains a slave clock, otherwise referred to herein as an endpoint clock. The second network device utilizes the transmit timestamp of the timing packet and an estimated network latency to adjust the endpoint clock in order to synchronize the endpoint clock with the source clock.

Some network devices maintain multiple clocks for synchronization in multiple synchronization domains, such as a global time synchronization domain, a local network time synchronization domain, an operations, administration and maintenance (OAM) synchronization domain, etc. In such network devices, it is challenging to implement timestamping at network interfaces (e.g., ports) of the network device because multiple clocks, corresponding to the multiple synchronization domains, maintained by the network device typically need to be provided to each network interface of the network device. Providing multiple clocks to each network interface of the network device complicates internal communication mechanisms in the network device, for example by increasing the number of communication lines (e.g., communication bus widths) needed for distribution of clocks in the network device. Moreover, network interfaces with capabilities to perform timestamping in multiple synchronization domains in a network device are more complicated as compared to network interfaces that are configured to perform timestamping in only a single synchronization domain maintained by a network device. For example, a network interface of the network device with capabilities to perform timestamping in multiple synchronization domains needs to determine a synchronization domain of the packet and to select the appropriate clock to be used to generate a timestamp for the packet. Configuring network interfaces with such capabilities increases cost, power consumption, physical size, etc. of the network interfaces of the network device.

SUMMARY

In an embodiment, a method for processing timing messages communicated in a communication network includes: receiving, at a packet processor of a network device and via an internal communication link within the network device, i) a timing message and ii) a first timestamp generated by a physical layer (PHY) processor of the network device, the first timestamp having been generated by the PHY processor using a local-domain clock used by the PHY processor, the first timestamp corresponding to a time, as measured by the local-domain clock, at which the PHY processor received the timing message via a network link coupled to the PHY processor, the network link being external to the network device; generating, at the packet processor, a second timestamp for the timing message using a domain-specific clock maintained by the network device, the second timestamp corresponding to a time at which the packet processor received the timing message; determining, at the packet processor, a delay value using the first timestamp, the delay value accounting for a time delay corresponding to the transfer of the timing message within the network device from the PHY processor to the packet processor; adjusting, at the packet processor, the second timestamp using the delay value to generate an adjusted domain-specific timestamp for the timing message, the adjusted domain-specific timestamp indicating a time, corresponding to the domain-specific clock, at which the PHY processor received the timing message via the network link; and performing, at the packet processor, at least one timing-related operation using the adjusted domain-specific timestamp.

In another embodiment, a network device comprises a packet processor configured to: receive, via an internal communication link within the network device, i) a timing message and ii) a first timestamp generated by a physical layer (PHY) processor, the first timestamp having been generated by the PHY processor using a local-domain clock used by the PHY processor, the first timestamp corresponding to a time, as measured by the local-domain clock, at which the PHY processor received the timing message via a network link coupled to the PHY processor, the network link being external to the network device; and generate a second timestamp for the timing message using a domain-specific clock maintained by the network device, the second timestamp corresponding to a time at which the packet processor received the timing message. The packet processor includes: a delay calculator configured to calculate a delay value using the first timestamp, the delay value accounting for a time delay corresponding to the transfer of the timing message within the network device from the PHY processor to the packet processor; and an adjusted timestamp calculator configured to adjust the second timestamp using the delay value to generate an adjusted domain-specific timestamp for the timing message, the adjusted domain-specific timestamp indicating a time, corresponding to the domain-specific clock, at which the PHY processor received the timing message via the network link. The packet processor is further configured to perform at least one timing-related operation using the adjusted domain-specific timestamp.

In yet another embodiment, a method for timestamping packets in a network device includes: generating, at a packet processor of the network device, a domain-specific timestamp for a timing message to be transmitted by the network device, the domain-specific timestamp generated using a domain-specific clock maintained by the network device; generating, at the packet processor, a first local-domain timestamp for the timing message, the first local-domain timestamp generated based on a first local-domain clock used by the packet processor; adjusting, at the packet processor, the domain-specific timestamp using the first local-domain timestamp to generate an adjusted domain-specific timestamp; transferring the timing message having the adjusted domain-specific timestamp from the packet processor to a physical layer (PHY) processor of the network device via an internal communication link within the network device; generating, at the PHY processor, a second local-domain timestamp using a second local-domain clock used by the PHY processor, the second local-domain timestamp corresponding to a time at which the PHY processor transmits the timing message via a network link communicatively coupled to the PHY processor and being external to the network device; modifying, at the PHY processor, timing information in the timing message using the second local-domain timestamp, the timing information being separate from the adjusted domain-specific timestamp; and transmitting, by the PHY processor, the timing message via the network link, the timing message including the adjusted domain-specific timestamp and the timing information when transmitted so that the adjusted domain-specific timestamp and the timing information is available to another network device that receives the timing message to use the timing information to further adjust the adjusted domain-specific timestamp to determine a time, measured by the domain-specific clock, at which the PHY processor transmitted the timing message via the network link.

In still another embodiment, a network device comprises a packet processor including a first timestamping engine configured to: generate a domain-specific timestamp for a timing message to be transmitted by the network device, the domain-specific timestamp generated using a domain-specific clock maintained by the network device; generate a first local-domain timestamp for the timing message, the first local-domain timestamp generated based on a first local-domain clock used by the packet processor; and adjust the domain-specific timestamp using the first local-domain timestamp to generate an adjusted domain-specific timestamp. The packet processor is configured to transfer the timing message having the adjusted domain-specific timestamp from the packet processor to a physical layer (PHY) processor of the network device via an internal communication link within the network device. The network device further comprises the PHY processor, which is configured to communicatively couple with one or more network links external to the network device. The PHY processor includes a second timestamping engine that is configured to: generate a second local-domain timestamp using a second local-domain clock used by the PHY processor; and modify timing information in the timing message using the second local-domain timestamp, the timing information being separate from the adjusted domain-specific timestamp. The PHY processor is further configured to transmit the timing message via at least one of the one or more network links, the timing message including the adjusted domain-specific timestamp and the timing information when transmitted so that the adjusted domain-specific timestamp and the timing information is available to another network device that receives the timing message to use the timing information to further adjust the adjusted domain-specific timestamp to determine a time, measured by the domain-specific clock, at which the PHY processor transmitted the timing message via the network link.

DETAILED DESCRIPTION

Figure 1:
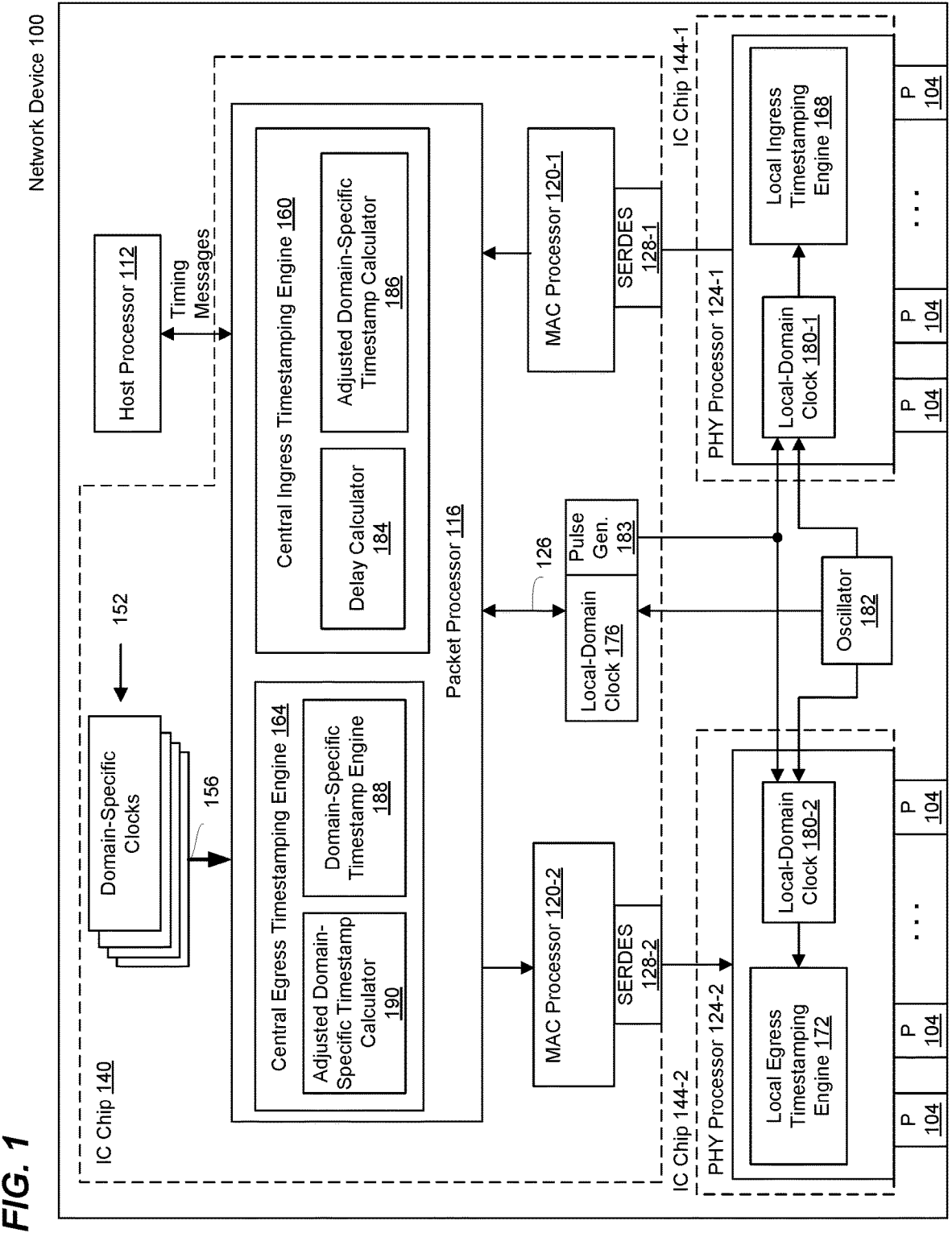
FIG. 1 is a block diagram of an example network device configured to perform timestamping of packets in multiple synchronization domains using a local-domain clocks used by physical layer (PHY) processors of the network device, according to an embodiment.

Timestamping of packets received by a network device or packets to be transmitted by a network device is generally performed as close as possible to the time of receipt of the packet by the network device or time of transmission of the packet by the network device. For example, in one-step timestamping performed by a network device, a synchronization packet transmitted by a source clock network device should include an egress timestamp generated as close as possible to the point of egress of the synchronization packet from the source clock network device, such as at a network interface via which the synchronization packet is egressed from the source clock network device, to allow an endpoint clock network device to accurately determine the time of transmission of the synchronization packet by the source clock network device. Similarly, an ingress timestamp for a synchronization packet received at an endpoint clock network device should be generated as close as possible to the point of ingress of the synchronization packet at the endpoint clock network device, such as at a network interface at which the synchronization is received by the endpoint clock network device. Thus, in a network device that is configured to perform synchronization in multiple synchronization domains (also sometimes referred to herein as time application interface (TAI) domains), multiple domain-specific clocks are typically supplied to each network interface of the network device to enable the network interfaces to generate timestamps for packets corresponding to respective ones of the multiple synchronization domains maintained in the network device. Further, in such typical network device, each network interface is configured to determine which domain-specific clock among the multiple domain-specific clocks is to be used for timestamping a packet as the packet is received or as the packet is being transmitted via the network interface of the network device, and to perform timestamping of the packet using the determined domain-specific clock. Providing multiple domain-specific clocks to the network interfaces of the network device increases internal communication demands in the network device. For example, wide communication busses are utilized to provide the multiple domain-specific clocks to the network interfaces of the network device. Further, requiring the network interfaces to perform domain-specific timestamping of packets increases the cost, size, power consumption, etc. of the network interfaces and, consequently, increases the cost, size, power consumption, etc. of the network device.

In embodiments described below, a network device is configured to perform timestamping of a packet using both a local-domain clock and a domain-specific clock maintained by the network device. The domain-specific clock is synchronized with a clock of another network device on a network, such as a network device that maintains a source clock for synchronization in the corresponding domain on the network, in an embodiment. The domain-specific clock is selected from among multiple domain-specific clocks maintained by the network device for synchronization in respective ones of multiple synchronization domains, in an embodiment. The local-domain clock, on the other hand, in a free-running clock that is not synchronized with any other clock, in an embodiment. As will be explained in more detail below, the local-domain clock is used to calculate internal delays experienced by packets transferred between timestamping engines within the network device, thereby facilitating use of a single local clock for timestamping packets at a physical layer (PHY) processor of the network device while still performing synchronization in multiple synchronization domains, in an embodiment.

In an embodiment, timestamping using the domain-specific clock is performed by a central timestamping engine coupled to multiple PHY processors of the network device and configured to generate timestamps for packets received and/or to be transmitted via respective ones of the PHY processors. On the other hand, timestamping using the local-domain clock is performed at the respective PHY processors of the network device as packets are received via the network interfaces or are being transmitted via the network interfaces of the network device. In embodiments, the local-domain clock is used by the network device to determine an internal delay experienced by a packet as the packet is transferred from the PHY processor to the central timestamping engine of the network device, or vice-versa. The network device is configured to use a determined internal delay for the packet to generate an adjusted domain-specific timestamp that captures a time that is at least substantially equal to the time of receipt of the packet at the network interface of the network device according to the domain-specific clock, in an embodiment. Similarly, for a packet being transmitted by a first network device to a second network device, the first network device embeds timing information in the packet to allow the second network device to adjust a domain-specific timestamp included in the packet and to generate an adjusted domain-specific timestamp that captures a time that is at least substantially equal to the time of transmission of the packet by the PHY processor of the network device according to the domain-specific clock, in an embodiment. Thus, as will be described in more detail below, using both the local-domain clock and domain-specific clocks to timestamp packets allows the network device to accurately timestamp packets corresponding to times of receipt of packets at PHY processors of the network device or transmission of packets from PHY processors of the network device without requiring the PHY processors to operate with multiple domain-specific clocks, thereby reducing internal communication demand and cost, size, power consumption, etc. of the network device, in at least some embodiments.

FIG. 1 is a block diagram of an example network device 100 configured to perform time synchronization in multiple synchronization domains, according to an embodiment. The network device 100 is configured to operate according to a synchronization protocol, such as the Institute of Electrical and Electronics Engineers (IEEE) 802.1AS time sensitive networking standard. In other embodiments, the network device 100 is configured to operate according to another synchronization protocols, such as the IEEE 1588 standard, commonly referred to as the "Precision Time Protocol" or "PTP," or another suitable synchronization protocol. The network device 100 is configured to implement one-step timestamping, in an embodiment. In this embodiment, the network device 100 is configured to embed timing information corresponding to a transmission time of a timing packet directly into the timing packet, on-the-fly, as the timing packet is transmitted from the network device 100. In another embodiment, the network device 100 is configured to perform two-step timestamping in which a transmission time of a timing packet is stored at the network device 100 and then transmitted in a follow-up packet after transmission of the timing packet.

The network device 100 includes a plurality of ports 104 configured to couple with respective network communication links (not shown) for communicatively coupling the network device 100 to one or more other devices (not shown) in a communication network. In an embodiment in which the network communication links comprise metallic cables (e.g., copper or cables or another suitable metallic cable), each of at least some of the ports 104 comprises a transformer and/or an inductor configured to filter signals transferred between the port 104 and the PHY processor 124, e.g., to provide attenuation of common-mode noise signals. In some embodiments in which the network communication links comprise cables (e.g., metallic cables, optical cables, etc.), each of at least some of the ports 104 additionally or alternatively comprises a connector configured to couple to cable connector attached to a cable.

The network device 100 also includes a host processor 112. In an embodiment, the host processor 112 comprises a central processing unit (CPU). In other embodiments, the host processor 112 comprises another suitable processor. The host processor 112 is configured to execute machine readable instructions stored in a memory (not shown) that is coupled to, or included within, the host processor 112. In some embodiments, the host processor 112 generates timing messages for transmission from the ports 104, such as PTP messages, or other suitable messages defined by a suitable network timing protocol. In some embodiments, the host processor 112 also processes timing messages that are received by the network device 100 via the ports 104.

The network device 100 also includes a packet processor 116. The packet processor 116 is configured to process packets that are to be transmitted by the network device 100 via the ports 104 and process packets that are received by the network device via the ports 104. The packet processor 116 is configured to process timing messages received from the host processor 112 and that are to be transmitted by the network device 100 via the ports 104, and transfer timing messages to the host processor 116 that are received by the network device 100 via the ports 104, according to some embodiments. The packet processor 116 is additionally or alternatively configured to process timing messages received via the ports 104, and to forward at least some of the timing messages to the ports 104 for transmission from the network device 100, according to some embodiments.

The network device 100 includes one or more media access control (MAC) processors 120. The MAC processors 120 are configured to perform MAC layer protocol operations with respect to packets that are received via the ports 104 and that are to be transmitted via the ports 104, in an embodiment.

The network device 100 also includes one or more physical layer (PHY) processors 124 configured to couple to respective sets of one or more ports 104. In an embodiment, each of at least some of the PHY processors 124 is configured to couple to a single port 104. In another embodiment, each of at least some of the PHY processors 124 is configured to couple to a set of multiple ports 104. In one embodiment, each of at least some of the PHY processors 124 is configured to couple to four ports 104. In another embodiment, each of at least some of the PHY processors 124 is configured to couple to eight ports 104. In another embodiment, each of at least some of the PHY processors 124 is configured to couple to sixteen ports 104. In other embodiments, each of at least some of the PHY processors 124 is configured to couple to a suitable number of ports 104 that is different than four, eight, and sixteen.

Each PHY processor 124 is coupled to a respective MAC processor 120 via a communication link that is internal to the network device 100. In some embodiments, each communication link comprises a serial communication link. In some such embodiments, network device 100 includes a respective serializer-deserializer (SERDES) 128 for each MAC processor 120 that is configured to receive packet data in a parallel format from the MAC processor 120 and convert the data in the parallel format into serial data, which is then transferred to the PHY processor 124 via the serial communication link. Similarly, the SERDES 128 is configured to receive serial packet data from the PHY processor 124 via the serial communication link and convert the serial packet data to packet data in a parallel format, which is then transferred to the MAC processor 120. In an embodiment, each MAC processor 120 is coupled to the packet processor 116 via a suitable data transfer interface.

In an embodiment, the communication links that couple PHY processors 124 to respective MAC processors 120 comprise media-independent interfaces, such as the universal serial 10 gigabit Ethernet media-independent interface (USXGMII) or another suitable media-independent interface. In some embodiments in which a PHY processor 124 couples to multiple ports 104, the communication link that couples the PHY processor 124 to the MAC processor 120 carries interleaved data for multiple ports 104.

Each PHY processor 124 comprises a respective transceiver (not shown) for each port 104 coupled to the PHY processor 124, according to an embodiment. In such embodiments, each transceiver of the PHY processor 124 is configured to transmit a transmit signal and receive a receive signal via the external network link (not shown) coupled to the PHY processor 124.

The packet processor 116, and the MAC processors 120 are implemented on a first integrated circuit (IC) chip 140, and the PHY processors 124 are implemented on respective second IC chips 144. In an embodiment, the host processor 112 is implemented on a third IC chip separate from the first IC chip 140 and the second IC chips 144. For example, the host processor 112 is communicatively coupled to the packet processor 116 via a suitable communication interface such as a Peripheral Component Interconnect Express (PCIe) interface, a Serial Management Interface (SMI), or another suitable interface. In another embodiment, the host processor 112 is an embedded processor included on the first IC chip 140.

In other embodiments, at least one MAC processor 120 and at least one of the PHY processor 124 are implemented on a single IC chip. In another embodiment, the packet processor 116, at least one MAC processor 120, and at least one of the PHY processor 124 are implemented on a single IC chip.

The network device 100 is configured to operate as an ordinary clock device that implements a source clock or an endpoint clock on the network, a boundary clock device that synchronizes with a source clock and relays the source clock to one or more endpoint devices on the network, or relay or transparent clock that is an intermediate device configured to relay system residence time from a source to one or more salve devices on the network, in various embodiments. Generally, the network device 100 is configured to generate timing packets and/or update timing information in received timing packets, and to transmit the timing packets to one or more other network devices on the network to allow the one or more other network devices to synchronize with the source clock on the network, in various embodiments. The network device 100 additionally or alternatively is configured to receive timing packets and to synchronize its own clocks based on timestamps in received timing packets. As used herein, the term "timing packets" refers to network data packets that include timestamps and/or other timing information. "Timing packets" are generated and transmitted by network devices in a network and are used for conducting timing-related procedures in the network, such as clock synchronization between network devices in the network.

In an embodiment, the network device 100 is configured to maintain a plurality of domain-specific clocks 152 corresponding to multiple synchronization domains (also sometimes referred to herein as time application interface (TAI) domains). For example, the network device 100 is configured to maintain four domain-specific clocks 152, respective domain-specific clocks 152 corresponding to respective ones of four different synchronization domains. In other embodiments, the network device 100 is configured to maintain fewer than four (e.g., one, two or three) domain-specific clocks 152 or more than four (e.g., five, six, seven, etc.) domain-specific clocks 152.

The domain-specific clocks 152 are maintained at the network device 100 using counters that are continually incremented and adjusted to maintain accurate clocks (e.g., time of day clocks) in the respective ones of the multiple synchronization domains maintained by the network device 100, in an embodiment. Interfaces 156, such as communication buses, are configured to provide the domain-specific clocks 152 to the packet processor 116.

In an example embodiment, a first domain-specific clock 152 is a global clock used by the network device 100 for synchronization to a global source clock, a second domain-specific clock 152 is a network domain clock used by the network device 100 for synchronization to a network source clock within the network in which the network device 100 is operating, a third domain-specific clock 152 is an operations, administration and maintenance (OAM) clock used by the network device 100 for OAM clock synchronization, etc. In other embodiments, the domain-specific clocks 152 additionally or alternatively include clocks used by the network device 100 for synchronization in other suitable synchronization domains.

In an embodiment, the network device 100 is configured to generate respective timing packets that include timestamps generated based on respective domain-specific clocks 152 maintained by the network device 100, to allow other network devices to synchronize to the respective domain-specific clocks in the respective synchronization domains. Similarly, in an embodiment, the network device 100 is configured to receive respective timing packets that include domain-specific timestamps generated for synchronization in respective synchronization domains, and to use the domain-specific timestamps for synchronization of the corresponding ones of the domain-specific clocks 152 maintained by the network device 100 for the respective synchronization domains.

In an embodiment, the packet processor 116 includes one or more central timestamping engines configured to generate domain-specific timing information for packets received by the network device 100 and/or packets to be transmitted by the network device 100. For example, the packet processor 116 includes a central ingress timestamping engine 160 configured to generate ingress domain-specific timestamps for packets received by the network device 100. The packet processor additionally or alternatively includes a central egress timestamping engine 164 configured to generate egress domain-specific timestamps for packets to be transmitted by the network device 100.

The PHY processors 124 include local timestamping engines configured to generate local timing information for packets received by the network device 100 and/or packets transmitted by the network device 100. For example, the PHY processor 124-1 includes a local ingress timestamping engine 168 configured to generate local timing information for packets ingressing the network device 100. Similarly, the PHY processor 124-2 includes a local egress timestamping engine 172 configured to generate local timing information for packets egressing the network device 100.

In some embodiments, the PHY processors 124 have the same or a similar structure. For example, the PHY processor 124-1 includes a local egress timestamping engine (the same as or similar to the local egress timestamping engine 172) configured to generate local timing information for packets egressing the network device 100, and the PHY processor 124-2 includes a local ingress timestamping engine (the same as or similar to the local ingress timestamping engine 168) configured to generate local timing information for packets ingressing the network device 100, according to an embodiment.

The plurality of domain-specific clocks 152 maintained by the network device 100 are provided to the packet processor 116 via the interfaces 156, according to an embodiment. The packet processor 116 is configured to perform various domain-specific timing operations using the domain-specific clocks 152, such as generating domain-specific timestamps using the domain-specific clocks 152, calculating adjustments to be applied to the domain-specific clocks 152 to synchronize the domain-specific clocks 152 to other domain-specific clocks in the corresponding synchronization domains, etc. The domain-specific clocks 152 are not provided to the PHY processors 124, in an embodiment.

The packet processor 116 also receives a local-domain clock 176. Additionally, each PHY processors 124 maintains a respective local-domain clock 180. The local-domain clock 176 and the local-domain clocks 180 are driven by a common oscillator 182 so that the local-domain clock 176 and the local-domain clocks 180 are synchronized in frequency. In an embodiment, phases of the local-domain clock 176 and the local-domain clocks 180 are also synchronized. For example, the local-domain clock 176 includes a pulse generator 183 that generates pulses that is synchronized with a clock edge (e.g., a rising edge or a falling edge) of the local-domain clock 176, and the local-domain clocks 180 use the pulses to align the phases of the local-domain clocks 180 to the local-domain clock 176, according to an embodiment. The pulse generator 183 generates pulses at a suitable frequency such as 1 Hz or another suitable frequency. In other embodiments, the pulse generate 183 is included in one of the local-domain clocks 180, and the local-domain clock 176 and the other local-domain clocks 180 uses the pulses to align the phases to the one local-domain clock 180.

In an embodiment, the packet processor 116 and the PHY processors 124 further synchronize times maintained by the local-domain clock 176 and the local-domain clocks 180. In another embodiment, a single local-domain clock is supplied to the packet processor 116 and the PHY processors 124.

The local-domain clock 176 and the local-domain clocks 180 are free-running clocks that are not synchronized to any of the domain-specific clocks 152, in an embodiment.

As will be explained in more detail below, the local-domain clock 176 and the local-domain clock 180-1 are used to calculate a delay experienced by a timing packet in transit from the PHY processor 124-1 to the packet processor 116, in an embodiment. As will also be explained in more detail below, the local-domain clock 176 and the local-domain clock 180-2 are used to calculate a delay experienced by timing packet in transmit from the packet processor 116 to the PHY processor 124-2, in an embodiment.

Figure 2:
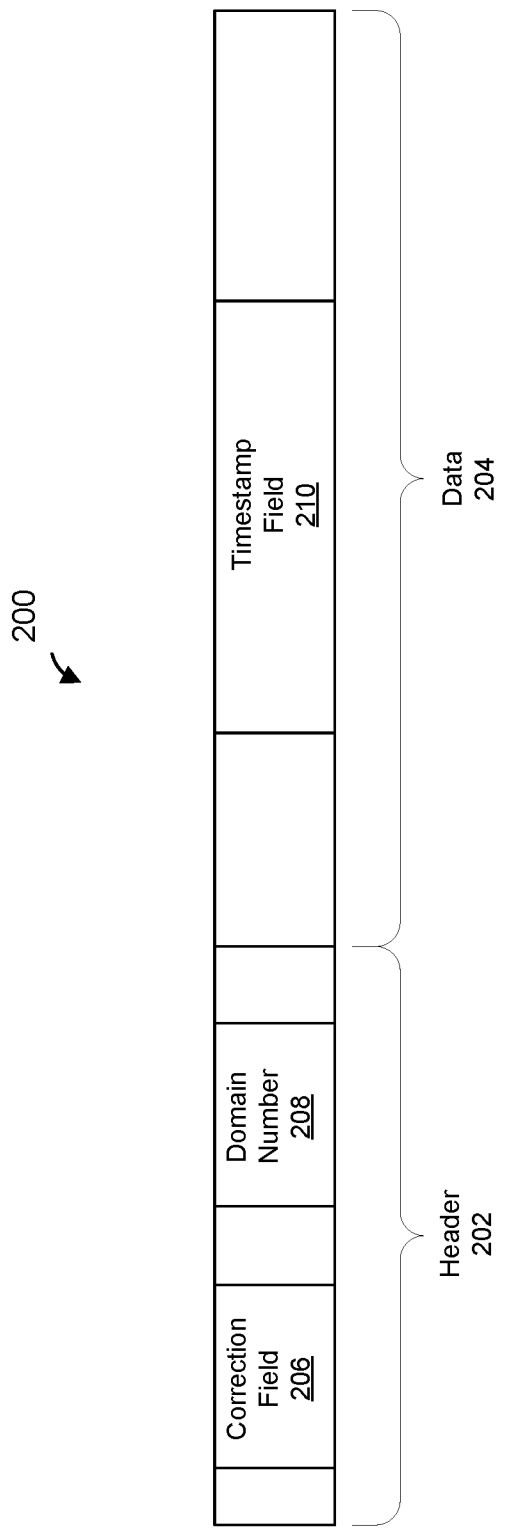
FIG. 2 is a diagram of a timing packet received or transmitted by the network device of FIG. 1, according to an embodiment.

Referring briefly to FIG. 2, an example timing message 200 corresponds to a timing message received by the network device 100 and/or a timing message transmitted by the network device 100, in an embodiment. The timing message 200 is a suitable timestamped data message used for performing clock synchronization, in an embodiment. The timing message 200 is a stand-alone timing packet or a timing message that is included in another data packet, in various embodiments. The timing message 200 includes a header 202 and a data portion 204. The header 202 includes a correction field 206, in an embodiment. The header 202 includes one or more other fields in addition to the correction field 206, in some embodiments. For example, the header 202 includes a domain number field 208 indicating a synchronization domain to which the timing message 200 corresponds, in an embodiment. The data portion 204 includes a timestamp field 210. In some embodiments, the data portion 204 includes one or more fields in addition to the timestamp field 210. For example, the data portion 204 includes a checksum trailer field (not shown), such as a UDP trailer field or another type of checksum trailer field. The data portion 204 omits the checksum trailer field, in some embodiments.

Referring now FIGS. 1 and 2, in one embodiment and/or scenario, the timing message 200 is received by the PHY processor 124-1 via one of the ports 104 coupled to the PHY processor 124-1. As discussed above, the ports 104 are coupled to respective network links (not shown) that are external to the network device 100. Thus, the time message 200 is received by the PHY processor 124-1 an external network link that is coupled to the PHY processor 124-1.

The timing message 200 is a timestamped synchronization message that includes a domain-specific timestamp in the timestamp field 210, in an embodiment. The timing message 200 additionally includes an indication of the synchronization domain to which the timing message 200 corresponds in the domain number field 208 in the header 202, in an embodiment. In an embodiment, when the timing message 200 is received by the PHY processor 124-1, the local ingress timestamping engine 168 generates a local ingress timestamp for the packet based on the current value of the local-domain clock 176. The MAC processor 110-1 transfers the timing message 200, along with the local ingress timestamp generated for the timing message 200, to the packet processor 116. In an embodiment, the PHY processor 124-1 stores the local ingress timestamp in a control header and appends the control header to the timing message 200.

The central ingress timestamping engine 160 of the packet processor 116 is configured to determine the synchronization domain to which the timing message 200 corresponds. For example, the central ingress timestamping engine 160 of the packet processor 116 is configured to determine the synchronization domain to which the timing message 200 corresponds based on the domain number field 208 in the header 202 of the timing message 200, in an embodiment. The central ingress timestamping engine 160 is further configured to generate an initial domain-specific timestamp for the timing message 200 using the domain-specific clock 152 that corresponds to the synchronization domain of the timing message 200.

Referring still to FIGS. 1 and 2, the central ingress timestamping engine 160 includes a delay calculator 184 configured to determine a delay experienced by the timing message 200 in transit from the local ingress timestamping engine 168 of the PHY processor 124-1 to the central ingress timestamping engine 160 of the packet processor 116, in an embodiment. The delay calculator 184 is configured to determine the delay experienced by the timing message 200 in transit from the local ingress timestamping engine 168 of the PHY processor 124-1 to the central ingress timestamping engine 160 of the packet processor 116 based on a difference between the local ingress timestamp generated for the timing message 200 by the local ingress timestamping engine 168 and the current value of the local-domain clock 176 at the time when the timing message 200 reaches the central ingress timestamping engine 160, in an embodiment. In an embodiment, the delay calculator 184 is configured to determine the delay by subtracting the local ingress timestamp generated for the timing message 200 by the local ingress timestamping engine 168 from the current value of the local-domain clock 176 at the time when the timing message 200 reaches the central ingress timestamping engine 160. The central ingress timestamping engine 160 also includes an adjusted domain-specific timestamp calculator 186, in an embodiment. The adjusted domain-specific timestamp calculator 186 is configured to generate an adjusted domain-specific timestamp for the timing message 200 to account for the delay experienced by the packet in transit from the local ingress timestamping engine 168 of the PHY processor 124-1 to the central ingress timestamping engine 160 of the packet processor 116, in an embodiment. In an embodiment, the adjusted domain-specific timestamp calculator 186 is configured to generate the adjusted domain-specific timestamp by subtracting the delay from the initial domain-specific timestamp generated by the central ingress timestamping engine 160 for the packet. Thus, the adjusted domain-specific timestamp captures the time that is at least substantially equal to the time of receipt of the timing message 200 by the PHY processor 124-1 according to the domain-specific clock 152 corresponding to the synchronization domain of the timing message 200 without requiring the PHY processor 124-1 to determine the synchronization domain of the packet or to utilize the domain-specific clock 152 corresponding to the synchronization domain of the timing message 200, in an embodiment.

In an embodiment, the network device 100 (e.g., the packet processor 116, the host processor 112, etc.) is configured to utilize the adjusted domain-specific timestamp to perform one or more timing-related operations in connection with the timing message 200. For example, in an embodiment in which the timestamp field 210 indicates a time at which the timing message 200 was transmitted by another network device, the host processor 112 uses the adjusted domain-specific timestamp generated for the timing message 200, which indicates a time at which the timing message 200 was received by the network device 100, to determine a transmit delay of the timing message 200 travelling from the other network device to the network device 100.

As another example in which the network device 100 receives the timing message 200 via one network link and then forwards the timing message 200 via another network link, the packet processor 116 uses the adjusted domain-specific timestamp generated for the timing message 200, which indicates a time at which the timing message 200 was received by the network device 100, to modify a value in the correction field 206 to account for a time period during which the timing message 200 resided in the network device 100.

Referring still to FIGS. 1 and 2, in another embodiment or scenario, the timing message 200 is a timing packet to be transmitted by the PHY processor 124-2 of the network device 100 via one or more of the ports 104 coupled to the PHY processor 124-2. For example, in an embodiment, the timing message 200 is a synchronization packet generated by the network device 100 for transmission to another network device on the network to allow the other network devices to synchronize a domain-specific clock maintained by the other network device with a corresponding domain-specific clock 152 maintained by the network device 100. In an embodiment, the central egress timestamping engine 164 of the packet processor 116 includes a domain-specific timestamp engine 188 configured to generate a domain-specific timestamp for the timing message 200 according to a current value of the domain-specific clock 152 maintained by the network device 100.

The central egress timestamping engine 164 also includes an adjusted domain-specific timestamp calculator 190 configured to generate a first local domain timestamp for the timing message 200 based on the local-domain clock 176 and to modify the domain-specific timestamp generated by the domain-specific timestamp engine 188 based on the local domain timestamp, in an embodiment. For example, the adjusted domain-specific timestamp calculator 190 modifies the domain-specific timestamp at least by subtracting at least a portion of the first local domain timestamp from the domain-specific timestamp, according to an embodiment. For instance, the adjusted domain-specific timestamp calculator 190 modifies the domain-specific timestamp at least by subtracting a nanoseconds portion of the first local domain timestamp from the domain-specific timestamp, according to an embodiment.

In an embodiment, the domain-specific timestamp engine 188 adds the domain-specific timestamp to the timing message (e.g., to the timestamp field 210), and the adjusted domain-specific timestamp calculator 190 modifies the domain-specific timestamp in the timing message (e.g., in the timestamp field 210). In another embodiment, the adjusted domain-specific timestamp calculator 190 receives the domain-specific timestamp from the domain-specific timestamp engine 188, modifies the domain-specific timestamp, and adds the modified domain-specific timestamp to the timing message (e.g., to the timestamp field 210).

When the timing message includes the modified domain-specific timestamp, the packet processor transfers the timing message to the PHY processor 124-2, in an embodiment.

The local egress timestamping engine 172 of the PHY processor 124-2 is configured to generate a second local domain timestamp based on a current value of the local-domain clock 180-2 at the time corresponding to when the timing message is transmitted by the PHY processor 124-2 via a network link that is external to the network device 100. In an embodiment, local egress timestamping engine 172 is configured to modify the timing message using at least a portion of the second local domain timestamp in the timing message 200, in an embodiment. For example, the local egress timestamping engine 172 is configured to modify the correction field 206 in the timing message 200 by adding a nanoseconds portion of the second local domain timestamp to a current value in the correction field 206, in an embodiment. In another embodiment, the local egress timestamping engine 172 is configured to embed the at least the portion of the second local domain timestamp into the correction field 206 of the timing message 200, in an embodiment. The PHY processor 124-2 is configured to transmit the timing message 200 with i) the modified domain-specific timestamp generated based on the domain-specific clock 152, and ii) the correction field modified using the at least the portion of the second local domain timestamp. With PTP, another network device (e.g., acting as a PTP slave device) that receives the timing message 200 is configured to add the value in the correction field 206 to the timestamp in the timestamp field 210. Thus, because the other network device (acting as the PTP slave device) will add the value in the correction field 206 to the timestamp in the timestamp field 210, the acts of the local egress timestamping engine 172 described above ensure that the egress time of the timing message 200 according to the domain-specific clock 152 is accurately reflected in the timing message 200 without requiring the PHY processor 124-2 to determine the synchronization domain of the timing message 200 or to utilize the domain-specific clock 152 corresponding to the synchronization domain of the timing message 200, in an embodiment.

With continued reference to FIG. 1, the domain-specific clocks 152 are maintained at the network device 100 using counters that are continually incremented and adjusted to maintain accurate clocks (e.g., time of day clocks) in the respective ones of the multiple synchronization domains maintained by the network device 100, in an embodiment. The local-domain clock 176 and the local-domain clocks 180 are free running clocks maintained at the IC chip 140 and the PHY processors 124, respectively, using respective counters that are utilized only for determining the internal delays in the network device 100, in an embodiment. In some embodiments, the counters utilized to maintain the domain-specific clocks 152 at the network device 100 are larger (e.g., have larger numbers of bits) as compared to the counters utilized to maintain the local-domain clock 176 and the local-domain clocks 180 at the network device 100, in an embodiment. As a more specific example, the counters utilized to maintain the domain specific clocks 152 utilize 48 bits to maintain seconds and 32 bits to maintain nanoseconds of the domain-specific clocks 152. On the other hand, the counters utilized to maintain local-domain clock 176 and the local-domain clocks 180 utilizes only 1 or 2 bits to maintain seconds and 30 bits to maintain nanoseconds of the local-domain clock, in an embodiment. Accordingly, interfaces, such as communication buses 156, configured to provide the domain-specific clocks 152 to the packet processor 116 are generally larger (e.g., wider busses, having more communication lines) as compared to generally smaller (e.g., narrower busses having fewer communication lines) interfaces configured to provide the local-domain clock 176 to the packet processor 116 and to respectively provide the local-domain clocks 180 to the PHY processors 124, in an embodiment.

In other embodiments, the counters utilized to maintain the local-domain clock 176 and the local-domain clocks 180 have a same or similar size as the size of the domain-specific clocks 152, but only portions of the bits of the local-domain clock 176 and the local-domain clocks 180 are used and thus interfaces that pass the portions of the bits of the local-domain clock 176 and the local-domain clocks 180 are smaller as compared to interface(s) used for the domain-specific clocks 152.

Thus, because the larger interfaces needed for the domain-specific clocks 152 are only needed to provide the domain-specific clocks 152 to the packet processor 116 and not to the multiple PHY processors 124, internal communication demands are reduced in the network device 100.

Referring still to FIG. 1, it is noted that although the network device 100 is illustrated in FIG. 1 as including only two PHY processors 124 and two MAC processors 120, the network device 100 generally includes more than two PHY processors 124 and/or more than two MAC processors 120, according to some embodiments. For example, the network device 100 generally includes tens of PHY processors 124 and MAC processors 120, according to some embodiments. Because the PHY processors 124 are configured to perform timestamping of packets in multiple synchronization domains using only the local-domain clocks 180 and without using the domain-specific clocks 152, the design of the network interface device 100 is greatly simplified and the cost, size, power consumption, etc. of the network interface 100 is greatly reduced, in various embodiments.

Figure 3:
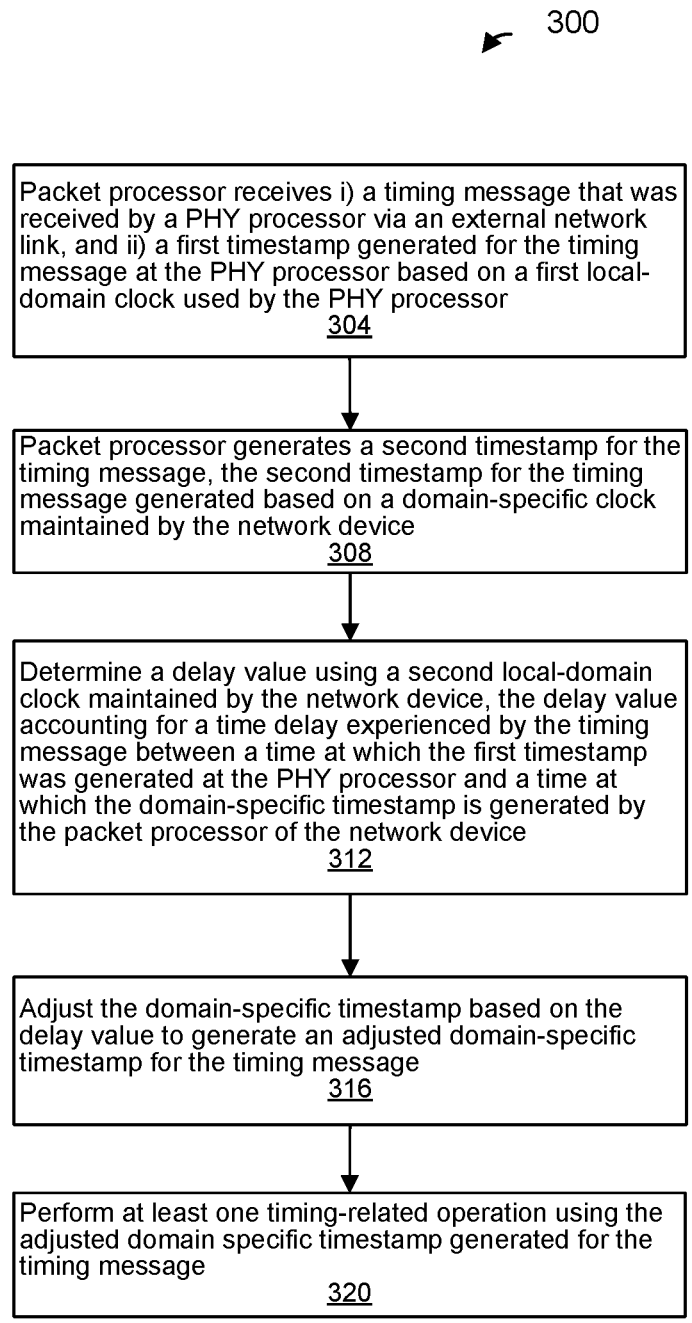
FIG. 3 is a flow diagram of an example method for processing timing packets in a network device such as the example network device of FIG. 1, according to an embodiment.

FIG. 3 is a flow diagram illustrating an example method 300 for processing timing messages for performing timing-related operations in a network device, according to an embodiment. In an embodiment, the network device 100 of FIG. 1 implements the method 300. For example, in an embodiment, the packet processor 116 of the network device 100 implements the method 300. For ease of explanation, the method 300 is described with reference to the network device 100 of FIG. 1 and the example timing message 200 of FIG. 2. In other embodiments, the method 300 is implemented by other suitable network devices and/or with timing messages having other suitable formats.

At block 304, a packet processor of a network device receives i) a timing message, and ii) a first timestamp generated for the timing message at a PHY processor based on a first local-domain clock used by the PHY processor. The timing message received by the packet processor at block 304 was previously received by a PHY processor of the network device via a network link that is external to the network device. The first timestamp corresponds to a first receipt time at which the PHY processor received the timing message via the network link that is external to the network device. In an embodiment, the packet processor receives the timing message and the first timestamp via a communication link between the PHY processor and the packet processor that is internal to the network device.

As an illustrative example, the PHY processor 124-1 receives the timing message 200, generates a first timestamp based on the first local-domain clock 180-1, writes the first timestamp to a control header, and appends the control header to the timing message, in an embodiment. The PHY processor 124-1 then transfers the timing message 200 to the packet processor 116 via a communication link between the PHY processor 124-1 and the MAC processor 120-1, in an embodiment.

At block 308, the packet processor generates a second timestamp for the timing message based on a domain-specific clock maintained by the network device. The second timestamp corresponds to a second receipt time at which the packet processor received the timing message from the PHY processor at block 304. In an embodiment, the second timestamp corresponds to a second receipt time at which the packet processor received the timing message. In an embodiment, generating the second timestamp at block 308 includes determining the synchronization domain to which the timing message corresponds, and selecting the appropriate domain-specific clock 152 to be used by the packet processor 116 to generate the second timestamp for the timing message.

In an embodiment, the central ingress timestamping engine 160 generates the second timestamp.

At block 312, the packet processor determines a delay experienced by the timing message between the time at which the first timestamp was generated at the PHY processor and a time at which the second timestamp is generated (block 308) by the packet processor of the network device. In an embodiment, the time delay is determined based on a second local-domain clock used by the packet processor, For example, the packet processor determines the delay based on a difference between the first timestamp generated for the timing message by the PHY processor and a current value of the second local-domain clock at a time when the timing message is received by the packet processor and/or when the packet processor generates the second timestamp (block 308), in an embodiment. In an embodiment, determining the delay at block 312 comprises the packet processor adjusting, when needed, a calculated delay to account for wraparound of the first local-domain clock or the second local-domain clock.

As an illustrative example, in an embodiment, the central ingress timestamping engine 160 (e.g., the delay calculator 184) of the packet processor 116 determines the delay experienced by the timing message 200 based on a difference between the first timestamp generated for the timing message 200 by the PHY processor 124-1 and the current value of the local-domain clock 176 at a time when the timing message 200 reaches the central ingress timestamping engine 160 and/or when the central ingress timestamping engine 160 generates the second timestamp (block 308) for the timing message 200, in an embodiment.

In an embodiment, the first local-domain clock and the second local-domain clock are different clocks. In an embodiment, the first local-domain clock and the second local-domain clock are driven by a common oscillator of the network device. In another embodiment, the first local-domain clock and the second local-domain clock correspond to a same local domain clock that is provided to the PHY processor and the packet processor.

At block 316, the packet processor generates an adjusted domain-specific timestamp for the timing message based on the delay determined at block 312. In an embodiment, the packet processor generates the adjusted domain-specific timestamp by subtracting the delay value determined at block 312 from the second timestamp generated for the timing message at block 308. Thus, the adjusted domain-specific timestamp captures a time that is at least substantially equal to the time of receipt of the timing message by the PHY processor according to the domain-specific clock corresponding to the synchronization domain of the timing message without requiring the PHY processor to determine the synchronization domain of the timing message or requiring the PHY processor to utilize the domain-specific clock corresponding to the synchronization domain of the timing message. In an embodiment, generating the adjusted domain-specific timestamp at block 316 comprises the packet processor adjusting, when needed, the adjusted domain-specific timestamp to account for wraparound of the first local-domain clock and/or the second local-domain clock.

As an illustrative example, the central ingress timestamping engine 160 (e.g., the adjusted domain-specific timestamp calculator 186) of the packet processor 116 determines the adjusted domain-specific timestamp for the timing message based on the delay determined at block 312, according to an embodiment.

At block 320, the packet processor performs at least one timing-related operation in connection with the timing message using the adjusted domain-specific timestamp generated for the timing message at block 316. In an embodiment in which a timestamp field in the timing message indicates a time at which the timing message was transmitted by another network device, the at least one timing-related operation comprises using the adjusted domain-specific timestamp generated at block 316, which indicates a time at which the timing message was received by the network device implementing the method 300, to determine a transmit delay of the timing message travelling from the other network device to the network device implementing the method 300.

In another example in which the network device is to forward the timing message via another network link, the packet processor uses the adjusted domain-specific timestamp generated at block 316, which indicates a time at which the timing message was received by the network device, to modify a value in the correction field of the timing message to account for a time period during which the timing message resided in the network device.

In an embodiment, the method 300 further comprises: the PHY processor of the network device receiving the timing message via the network link that is external to the network device; the PHY processor generating the first timestamp based on the first local-domain clock; and the PHY processor transferring the timing message to the packet processor 116 via the communication link that is internal to the network device. In an embodiment, the communication link that is internal to the network device comprises a serial communication link. In an embodiment, the serial communication link operates according to a media-independent interface such as the USXGMII or another suitable media-independent interface. In an embodiment, the PHY processor 124-1 transfers the timing message to the MAC processor 120-1 via the communication link that is internal to the network device, and the MAC processor 120-1 transfers the timing message to the packet processor 116.

As an illustrative example, the PHY processor 124-1 receives the timing message 200, the local ingress timestamping engine 168 generates the first timestamp based on the first local-domain clock 180-1, writes the first timestamp in a control header, and appends the control header to the timing message 200, in an embodiment. The PHY processor 124-1 then transfers the timing message 200 to the packet processor 116 via a communication link between the PHY processor 124-1 and the MAC processor 120-1, in an embodiment.

Figure 4:
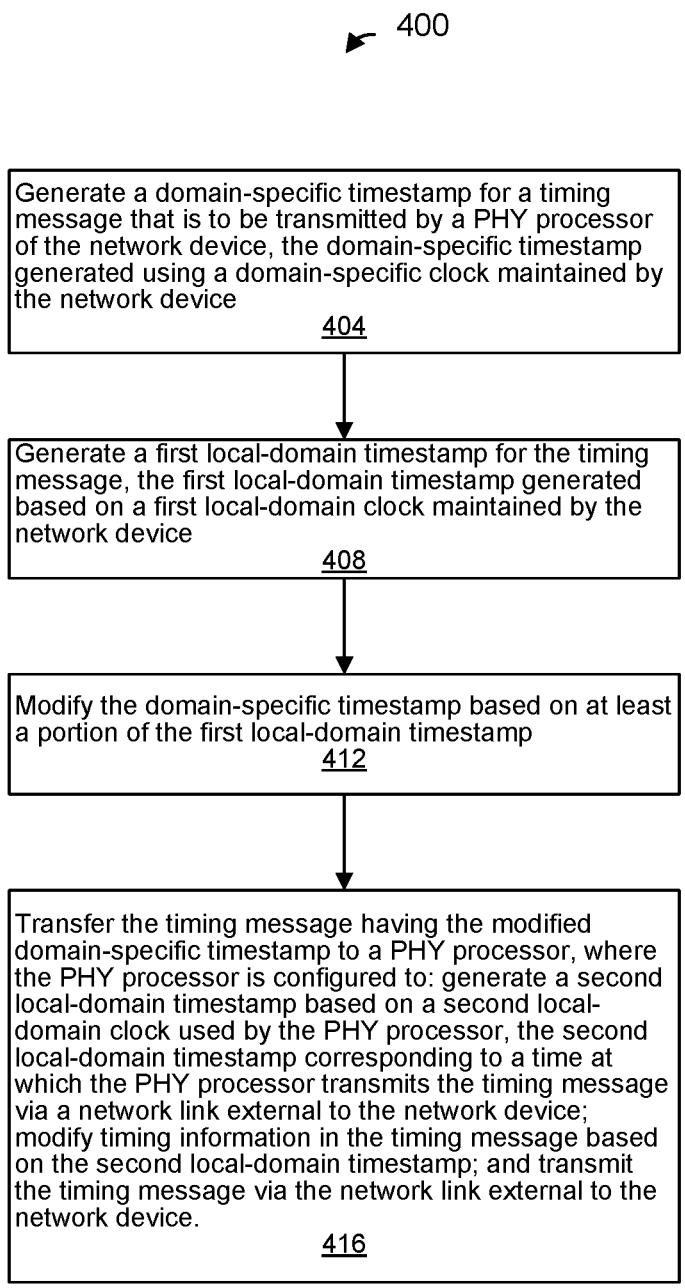
FIG. 4 is a flow diagram of an example method for timestamping packets in a network device such as the example network device of FIG. 1, according to an embodiment.

FIG. 4 is a flow diagram of an example method 400 for timestamping packets in a network device, according to an embodiment. In an embodiment, the network device 100 of FIG. 1 implements the method 400. For example, in an embodiment, the packet processor 116 of the network device 100 implements the method 400. For ease of explanation, the method 400 is described with reference to the network device 100 of FIG. 1 and the example timing message 200 of FIG. 2. In other embodiments, the method 400 is implemented by other suitable network devices and/or with timing messages having other suitable formats.

At block 404, a packet processor of the network device generates a domain-specific timestamp for a timing message that is to be transmitted by a PHY processor of the network device. For example, in an embodiment, the central egress timestamping engine 164 (e.g., the domain-specific timestamp engine 188) of the packet processor 116 device generates the domain-specific timestamp for the timing message. In an embodiment, the packet processor generates the domain-specific timestamp for the timing message 200 of FIG. 2 to be transmitted by the network device. In an embodiment, the domain-specific timestamp is generated at block 404 using a domain-specific clock maintained by the network device. For example, the domain-specific timestamp is generated based on a domain-specific clock 152 corresponding to the synchronization domain of the packet. In some embodiments, the packet processor adds the domain-specific timestamp to the timing message, e.g., in a timestamp field such as the timestamp field 210.

For example, the domain-specific timestamp engine 188 generates the domain-specific timestamp, in an embodiment. In an embodiment, the domain-specific timestamp engine 188 adds the domain-specific timestamp to the timestamp field 210.

At block 408, the packet processor generates a first local-domain timestamp for the timing message to be transmitted by the PHY processor. For example, in an embodiment, the central egress timestamping engine 164 (e.g., the local-domain timestamp generator 190) of the packet processor 116 generates the first local-domain timestamp for the timing message. In an embodiment, the first local-domain timestamp is generated by the packet processor based on a first local-domain clock used by the packet processor. For example, the first local-domain timestamp is generated by the packet processor based on the local-domain clock 176.

As an illustrative example, the adjusted domain-specific timestamp calculator 188 generates the first local domain timestamp based on the local-domain clock 176, in an embodiment.

At block 412, the packet processor modifies the domain-specific timestamp based on at least a portion of the first local-domain timestamp generated at block 408. In an embodiment, the packet processor modifies the domain-specific timestamp by subtracting a nanoseconds portion of the first local-domain timestamp from the domain-specific timestamp. In an embodiment, the packet processor 116 adds the domain-specific timestamp to the timing message (e.g., to the timestamp field 210) and then modifies the domain-specific timestamp in the timing message. In another embodiment, the packet processor 116 modifies the domain-specific timestamp and then adds the modified domain-specific timestamp to the timing message (e.g., to the timestamp field 210).

In an embodiment, modifying the domain-specific timestamp at block 412 comprises the packet processor adjusting, when needed, the modified domain-specific timestamp to account for wraparound of the first local-domain clock.

As an illustrative example, the adjusted domain-specific timestamp calculator 190 modifies the domain-specific timestamp, in an embodiment. In an embodiment, the packet processor 116 adds (e.g., the domain-specific timestamp engine 188 adds) the domain-specific timestamp to the timing message (e.g., to the timestamp field 210) and then the packet processor 116 (e.g., the adjusted domain-specific timestamp calculator 190) modifies the domain-specific timestamp in the timing message. In another embodiment, the packet processor 116 (e.g., the adjusted domain-specific timestamp calculator 190) modifies the domain-specific timestamp and then adds the modified domain-specific timestamp to the timing message (e.g., to the timestamp field 210).

At block 416, the packet processor transfers the timing message with the modified domain-specific timestamp (block 412) to the PHY processor that is to transmit the timing message. In an embodiment, the packet processor transfers the timing message with the modified domain-specific timestamp to the PHY processor via the communication link that is internal to the network device. In an embodiment, the communication link that is internal to the network device comprises a serial communication link. In an embodiment, the serial communication link operates according to a media-independent interface such as the USXGMII or another suitable media-independent interface. In an embodiment, the packet processor 116 transfers the timing message with the modified domain-specific timestamp to the MAC processor 120-2; and the MAC processor 120-2 transfers the timing message with the modified domain-specific timestamp to the PHY processor 124-2 via the communication link that is internal to the network device.

In an embodiment, the PHY processor is configured to generate a second local-domain timestamp based on a second local-domain clock used by the PHY processor; add timing information to the timing message, the timing information based on at least a portion of the second local-domain timestamp; and transmit the timing message via a network link that is external to the network device. In an embodiment, the second local-domain timestamp corresponds to a time at which the PHY processor transmits the timing message via the network link that is external to the network device.

In an embodiment, the first local-domain clock and the second local-domain clock are different clocks. In an embodiment, the first local-domain clock and the second local-domain clock are driven by a common oscillator of the network device. In another embodiment, the first local-domain clock and the second local-domain clock correspond to a same local domain clock that is provided to the PHY processor and the packet processor.

By modifying the domain-specific timestamp in the timing message based on the at least the portion of the first local-domain timestamp (block 412), and including in the timing message timing information based on the at least the portion of the second local-domain clock, the timing message includes timing information (e.g., the modified domain-specific timestamp and the timing information) that indicates a time, in the context of the domain-specific clock, at which the PHY processor transmitted the timing message. For example, the delay between when the domain-specific timestamp is generated and when the PHY processor transmits the timing message corresponds to the at least the portion of the second local-domain timestamp minus the at least the portion of the first local-domain timestamp, in an embodiment. A second network device that receives the timing message generates a sum of the timing information and the modified domain-specific timestamp, which corresponds to a sum of the unmodified domain-specific timestamp and the delay, in an embodiment.

In an embodiment, the second network device that receives the timing message performs a timing-related operation using the timing message. For example, the second network device uses timing information in the timing message to determine a delay from when the first network device transmitted the timing message and when the second network device received the timing message.

In an embodiment, the method 400 further comprises: the PHY processor of the network device receiving the timing message via the communication link that is internal to the network device; the PHY processor generating the second local-domain timestamp based on the second local-domain clock; the PHY processor modifying timing information in the timing message based on the second local-domain timestamp, the timing information being separate from the modified domain-specific timestamp; and the PHY processor transmitting the timing message via the network link that is external to the network device. In an embodiment, the PHY processor modifying timing information in the timing message comprises the PHY processor modifying a correction field in the timing message at least by subtracting at least a portion of the second local-domain timestamp from a current value in the correction field.

In an embodiment, modifying the timing information in the timing message based on the second local-domain timestamp comprises the PHY processor adjusting, when needed, the modified timing information to account for wraparound of the second local-domain clock.

As an illustrative example, the PHY processor 124-2 receives the timing message; the local egress timestamping engine 172 generates the second local-domain timestamp based on the local-domain clock 180-2 and modifies a current value of the correction field 206 based on the second local-domain timestamp; and the PHY processor 124-2 transmits the timing message via one of the ports 104 coupled to the PHY processor 124-2, according to an embodiment.

In another embodiment, the method 400 further comprises: the PHY processor of the network device receiving the timing message via the communication link that is internal to the network device; the PHY processor generating the second local-domain timestamp based on the second local-domain clock; the PHY processor embedding the at least the portion of the second local-domain timestamp in the timing message, the embedded at least the portion of the second local-domain timestamp being separate from the modified domain-specific timestamp in the timing message; and the PHY processor transmitting the timing message via the network link that is external to the network device. In an embodiment, the PHY processor embedding the at least the portion of the second local-domain timestamp in the timing message comprises the PHY processor writing the at least a portion of the second local-domain timestamp to a correction field in the timing message.

As an illustrative example, the PHY processor 124-2 receives the timing message; the local egress timestamping engine 172 generates the second local-domain timestamp based on the local-domain clock 180-2 and embeds the second local-domain timestamp in the correction field 206; and the PHY processor 124-2 transmits the timing message via one of the ports 104 coupled to the PHY processor 124-2, according to an embodiment.

In an embodiment, the communication link that is internal to the network device comprises a serial communication link. In an embodiment, the serial communication link operates according to a media-independent interface such as the USXGMII or another suitable media-independent interface. In an embodiment, the MAC processor 120-2 transfers the timing message to the PHY processor 124-2 via the communication link that is internal to the network device, and the PHY processor 124-2 transmits the timing message via one or more of the ports 104.

Figure 5:
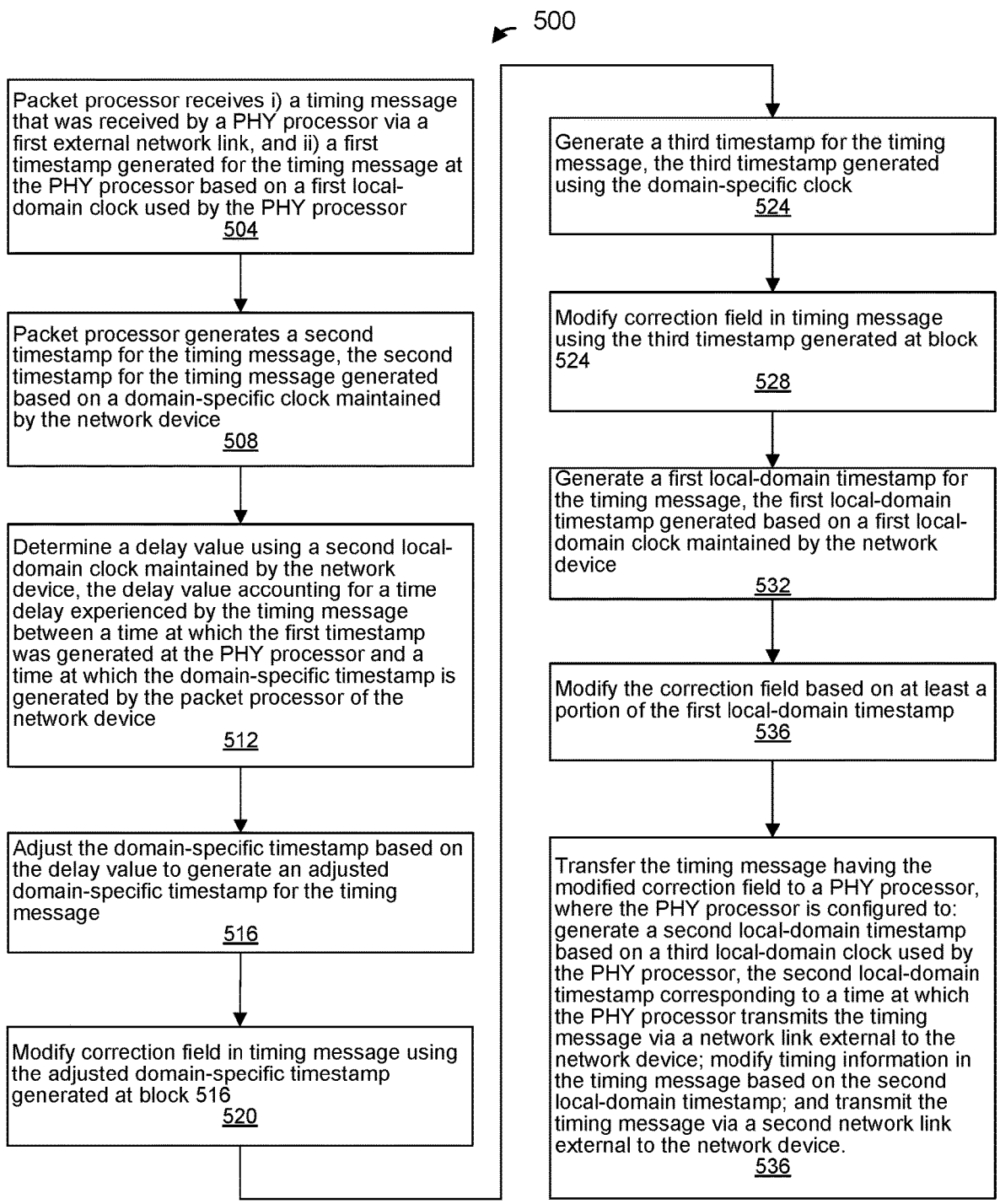
FIG. 5 is a flow diagram of another example method for processing timing packets in a network device such as the example network device of FIG. 1, according to another embodiment.

FIG. 5 is a flow diagram illustrating another example method 500 for processing timing messages for performing timing-related operations in a network device, according to an embodiment. In an embodiment, the network device 100 of FIG. 1 implements the method 500. For example, in an embodiment, the packet processor 116 of the network device 100 implements the method 500. For ease of explanation, the method 500 is described with reference to the network device 100 of FIG. 1 and the example timing message 200 of FIG. 2. In other embodiments, the method 500 is implemented by other suitable network devices and/or with timing messages having other suitable formats.

At block 504, a packet processor of a network device receives i) a timing message, and ii) a first timestamp generated for the timing message at a PHY processor based on a first local-domain clock used by the PHY processor. The timing message received by the packet processor at block 504 was previously received by a PHY processor of the network device via a network link that is external to the network device. The first timestamp corresponds to a first receipt time at which the PHY processor received the timing message via the network link that is external to the network device. In an embodiment, the packet processor receives the timing message and the first timestamp via a communication link between the PHY processor and the packet processor that is internal to the network device.

As an illustrative example, the PHY processor 124-1 receives the timing message 200, generates a first timestamp based on the first local-domain clock 180-1, writes the first timestamp to a control header, and appends the control header to the timing message, in an embodiment. The PHY processor 124-1 then transfers the timing message 200 to the packet processor 116 via a communication link between the PHY processor 124-1 and the MAC processor 120-1, in an embodiment.

At block 508, the packet processor generates a second timestamp for the timing message based on a domain-specific clock maintained by the network device. The second timestamp corresponds to a second receipt time at which the packet processor received the timing message from the PHY processor at block 504. In an embodiment, the second timestamp corresponds to a second receipt time at which the packet processor received the timing message. In an embodiment, generating the second timestamp at block 508 includes determining the synchronization domain to which the timing message corresponds, and selecting the appropriate domain-specific clock 152 to be used by the packet processor 116 to generate the second timestamp for the timing message.

In an embodiment, the central ingress timestamping engine 160 generates the second timestamp.

At block 512, the packet processor determines a delay experienced by the timing message between the time at which the first timestamp was generated at the PHY processor and a time at which the second timestamp is generated (block 508) by the packet processor of the network device. In an embodiment, the time delay is determined based on a second local-domain clock used by the packet processor, For example, the packet processor determines the delay based on a difference between the first timestamp generated for the timing message by the PHY processor and a current value of the second local-domain clock at a time when the timing message is received by the packet processor and/or when the packet processor generates the second timestamp (block 508), in an embodiment. In an embodiment, determining the delay at block 512 comprises the packet processor adjusting, when needed, a calculated delay to account for wraparound of the first local-domain clock or the second local-domain clock.

As an illustrative example, in an embodiment, the central ingress timestamping engine 160 (e.g., the delay calculator 184) of the packet processor 116 determines the delay experienced by the timing message 200 based on a difference between the first timestamp generated for the timing message 200 by the PHY processor 124-1 and the current value of the local-domain clock 176 at a time when the timing message 200 reaches the central ingress timestamping engine 160 and/or when the central ingress timestamping engine 160 generates the second timestamp (block 508) for the timing message 200, in an embodiment.

In an embodiment, the first local-domain clock and the second local-domain clock are different clocks. In an embodiment, the first local-domain clock and the second local-domain clock are driven by a common oscillator of the network device. In another embodiment, the first local-domain clock and the second local-domain clock correspond to a same local domain clock that is provided to the PHY processor and the packet processor.

At block 516, the packet processor generates an adjusted domain-specific timestamp for the timing message based on the delay determined at block 512. In an embodiment, the packet processor generates the adjusted domain-specific timestamp by subtracting the delay value determined at block 512 from the second timestamp generated for the timing message at block 508. Thus, the adjusted domain-specific timestamp captures a time that is at least substantially equal to the time of receipt of the timing message by the PHY processor according to the domain-specific clock corresponding to the synchronization domain of the timing message without requiring the PHY processor to determine the synchronization domain of the timing message or requiring the PHY processor to utilize the domain-specific clock corresponding to the synchronization domain of the timing message. In an embodiment, generating the adjusted domain-specific timestamp at block 516 comprises the packet processor adjusting, when needed, the adjusted domain-specific timestamp to account for wraparound of the first local-domain clock and/or the second local-domain clock.

As an illustrative example, the central ingress timestamping engine 160 (e.g., the adjusted domain-specific timestamp calculator 186) of the packet processor 116 determines the adjusted domain-specific timestamp for the timing message based on the delay determined at block 512, according to an embodiment.

At block 520, the packet processor modifies a correction field in the timing message using the adjusted domain-specific timestamp generated for the timing message at block 516. For example, the central ingress timestamping engine 160 subtracts a value of the adjusted domain-specific timestamp from a current value of the correction field, in an embodiment.

At block 524, a packet processor of the network device generates a third timestamp for the timing message. The third timestamp is generated using the domain-specific clock and corresponds to a time at which the timing message is transmitted by the network device. For example, in an embodiment, the central egress timestamping engine 164 (e.g., the domain-specific timestamp engine 188) of the packet processor 116 device generates the third timestamp for the timing message. In an embodiment, the packet processor generates the third timestamp for the timing message 200 of FIG. 2 to be transmitted by the network device. In an embodiment, the third timestamp is generated based on a domain-specific clock 152 corresponding to the synchronization domain of the timing message.

At block 528, the packet processor modifies the correction field in the timing message using the third timestamp generated for the timing message at block 524. For example, the central egress timestamping engine 164 adds a value of the third timestamp to the current value of the correction field, in an embodiment.

At block 532, the packet processor generates a first local-domain timestamp for the timing message. For example, in an embodiment, the central egress timestamping engine 164 (e.g., the local-domain timestamp generator 190) of the packet processor 116 generates the first local-domain timestamp for the timing message. In an embodiment, the first local-domain timestamp is generated by the packet processor based on the second local-domain clock used by the packet processor. For example, the first local-domain timestamp is generated by the packet processor based on the local-domain clock 176.

As an illustrative example, the adjusted domain-specific timestamp calculator 188 generates the first local domain timestamp based on the local-domain clock 176, in an embodiment.

At block 536, the packet processor modifies the correction field in the timing message based on at least a portion of the first local-domain timestamp generated at block 532. In an embodiment, the packet processor modifies the correction field by subtracting a nanoseconds portion of the first local-domain timestamp from the current value of the correction field. In an embodiment, modifying the correction field at block 536 comprises the packet processor adjusting, when needed, a modified correction field value to account for wraparound of the first local-domain clock. As an illustrative example, the adjusted domain-specific timestamp calculator 190 modifies the correction field, in an embodiment.

At block 540, the packet processor transfers the timing message with the modified correction field (block 536) to a PHY processor that is to transmit the timing message (the "transmitting PHY processor"). In some instances, the transmitting PHY processor is the same PHY processor from which the packet processor received the timing message at block 504. In other instances, the transmitting PHY processor is different from the PHY processor from which the packet processor received the timing message at block 504.

In an embodiment, the packet processor transfers the timing message with the modified domain-specific timestamp to the transmitting PHY processor via the communication link that is internal to the network device. In an embodiment, the communication link that is internal to the network device comprises a serial communication link. In an embodiment, the serial communication link operates according to a media-independent interface such as the USXGMII or another suitable media-independent interface. In an embodiment, the packet processor 116 transfers the timing message with the modified domain-specific timestamp to the MAC processor 120-2; and the MAC processor 120-2 transfers the timing message with the modified correction field to the PHY processor 124-2 via the communication link that is internal to the network device.

In an embodiment, the transmitting PHY processor is configured to generate a second local-domain timestamp based on a third local-domain clock used by the transmitting PHY processor; add timing information to the timing message, the timing information based on at least a portion of the second local-domain timestamp; and transmit the timing message via a network link that is external to the network device. In an embodiment, the second local-domain timestamp corresponds to a time at which the PHY processor transmits the timing message via the network link that is external to the network device.

In an embodiment, the first local-domain clock, the second local-domain clock, and the third local-domain clock are different clocks. In an embodiment, the first local-domain clock, the second local-domain clock, and the third local-domain clock are driven by a common oscillator of the network device. In another embodiment, the first local-domain clock, the second local-domain clock, and the third local-domain clock correspond to a same local domain clock that is provided to the PHY processor that provided the timing message to the packet processor at block 504, the packet processor, and the transmitting PHY processor.

By modifying the correction field in the timing message based on the at least the portion of the first local-domain timestamp (block 536), and including in the timing message timing information based on the at least the portion of the third local-domain clock (block 540), the timing message includes timing information (e.g., the correction field) that accounts for a time period, in the context of the domain-specific clock, during which the timing message resided in the network device.

In an embodiment, the second network device that receives the timing message performs a timing-related operation using the timing message.

In an embodiment, the method 500 further comprises: the PHY processor (that provides the timing message to the packet processor at block 504) of the network device receiving the timing message via the network link that is external to the network device; the PHY processor generating the first timestamp based on the first local-domain clock; and the PHY processor transferring the timing message to the packet processor 116 via the communication link that is internal to the network device. In an embodiment, the communication link that is internal to the network device comprises a serial communication link. In an embodiment, the serial communication link operates according to a media-independent interface such as the USXGMII or another suitable media-independent interface. In an embodiment, the PHY processor 124-1 transfers the timing message to the MAC processor 120-1 via the communication link that is internal to the network device, and the MAC processor 120-1 transfers the timing message to the packet processor 116.

As an illustrative example, the PHY processor 124-1 receives the timing message 200, the local ingress timestamping engine 168 generates the first timestamp based on the first local-domain clock 180-1, writes the first timestamp in a control header, and appends the control header to the timing message 200, in an embodiment. The PHY processor 124-1 then transfers the timing message 200 to the packet processor 116 via a communication link between the PHY processor 124-1 and the MAC processor 120-1, in an embodiment.

In an embodiment, the method 500 further comprises: the transmitting PHY processor receiving the timing message via the communication link that is internal to the network device; the PHY processor generating the second local-domain timestamp based on the third local-domain clock; the PHY processor modifying timing information in the timing message based on the second local-domain timestamp; and the PHY processor transmitting the timing message via the network link that is external to the network device. In an embodiment, the PHY processor modifying timing information in the timing message comprises the PHY processor modifying the correction field in the timing message at least by subtracting at least a portion of the second local-domain timestamp from a current value in the correction field.

In an embodiment, modifying the timing information in the timing message based on the second local-domain timestamp comprises the PHY processor adjusting, when needed, the modified timing information to account for wraparound of the third local-domain clock.

As an illustrative example, the PHY processor 124-2 receives the timing message; the local egress timestamping engine 172 generates the second local-domain timestamp based on the local-domain clock 180-2 and modifies a current value of the correction field 206 based on the second local-domain timestamp; and the PHY processor 124-2 transmits the timing message via one of the ports 104 coupled to the PHY processor 124-2, according to an embodiment.

In an embodiment, the communication link that is internal to the network device comprises a serial communication link. In an embodiment, the serial communication link operates according to a media-independent interface such as the USXGMII or another suitable media-independent interface. In an embodiment, the MAC processor 120-2 transfers the timing message to the PHY processor 124-2 via the communication link that is internal to the network device, and the PHY processor 124-2 transmits the timing message via one or more of the ports 104.

Embodiment 1: A method for processing timing messages communicated in a communication network, the method comprising: receiving, at a packet processor of a network device and via an internal communication link within the network device, i) a timing message and ii) a first timestamp generated by a physical layer (PHY) processor of the network device, the first timestamp having been generated by the PHY processor using a local-domain clock used by the PHY processor, the first timestamp corresponding to a time, as measured by the local-domain clock, at which the PHY processor received the timing message via a network link coupled to the PHY processor, the network link being external to the network device; generating, at the packet processor, a second timestamp for the timing message using a domain-specific clock maintained by the network device, the second timestamp corresponding to a time at which the packet processor received the timing message; determining, at the packet processor, a delay value using the first timestamp, the delay value accounting for a time delay corresponding to the transfer of the timing message within the network device from the PHY processor to the packet processor; adjusting, at the packet processor, the second timestamp using the delay value to generate an adjusted domain-specific timestamp for the timing message, the adjusted domain-specific timestamp indicating a time, corresponding to the domain-specific clock, at which the PHY processor received the timing message via the network link; and performing, at the packet processor, at least one timing-related operation using the adjusted domain-specific timestamp.

Embodiment 2: The method for processing timing messages of embodiment 1, wherein: the local-domain clock is a first local-domain clock used by the PHY processor; and determining, at the packet processor, the delay value comprises determining the delay value using i) the first timestamp and ii) a second local-domain clock to determine the delay value, the second local-domain clock used by the packet processor.

Embodiment 3: The method for processing timing messages of either of embodiments 1 or 2, wherein adjusting the second timestamp based on the delay value to generate the adjusted domain-specific timestamp for the timing message comprises subtracting the delay value from the second timestamp.

Embodiment 4: The method for processing timing messages of any of embodiments 1-3, wherein performing at least one timing-related operation using the adjusted domain-specific timestamp comprises using the adjusted domain-specific timestamp to determine a delay from when another network device transmitted the timing message until the timing message was received by the network device.

Embodiment 5: The method for processing timing messages of any of embodiments 1-4, further comprising: receiving, at the PHY processor the timing message via the network link coupled to the PHY processor; in connection with receiving the timing message at the PHY processor, generating, at the PHY processor, the first timestamp using the local-domain clock; and transferring i) the timing message and ii) the first timestamp from the PHY processor to the packet processor via the internal communication link within the network device.

Embodiment 6: A network device, comprising a packet processor configured to: receive, via an internal communication link within the network device, i) a timing message and ii) a first timestamp generated by a physical layer (PHY) processor, the first timestamp having been generated by the PHY processor using a local-domain clock used by the PHY processor, the first timestamp corresponding to a time, as measured by the local-domain clock, at which the PHY processor received the timing message via a network link coupled to the PHY processor, the network link being external to the network device; and generate a second timestamp for the timing message using a domain-specific clock maintained by the network device, the second timestamp corresponding to a time at which the packet processor received the timing message. The packet processor includes: a delay calculator configured to calculate a delay value using the first timestamp, the delay value accounting for a time delay corresponding to the transfer of the timing message within the network device from the PHY processor to the packet processor; and an adjusted timestamp calculator configured to adjust the second timestamp using the delay value to generate an adjusted domain-specific timestamp for the timing message, the adjusted domain-specific timestamp indicating a time, corresponding to the domain-specific clock, at which the PHY processor received the timing message via the network link. The packet processor is further configured to perform at least one timing-related operation using the adjusted domain-specific timestamp.

Embodiment 7: The network device of embodiment 6, wherein: the local-domain clock is a first local-domain clock; the packet processor includes, or is coupled to, a second local-domain clock; and the delay calculator is configured to determine the delay value using i) the first timestamp and ii) the second local-domain clock.

Embodiment 8: The network device of either of embodiments 6 or 7, wherein the adjusted timestamp calculator is configured to subtract the delay value from the second timestamp.

Embodiment 9: The network device of any of embodiments 6-8, wherein the packet processor is configured to perform at least one timing-related operation by using the adjusted domain-specific timestamp to determine a delay from when another network device transmitted the timing message until the timing message was received by the network device.

Embodiment 10: The network device of any of embodiments 6-9, further comprising the PHY processor, the PHY processor being configured to: receive the timing message via the network link coupled to the PHY processor; in connection with receiving the timing message at the PHY processor, generate the first timestamp using the local-domain clock; and transfer i) the timing message and ii) the first timestamp from the PHY processor to the packet processor via the internal communication link within the network device.

Embodiment 11: A method for timestamping packets in a network device, the method comprising: generating, at a packet processor of the network device, a domain-specific timestamp for a timing message to be transmitted by the network device, the domain-specific timestamp generated using a domain-specific clock maintained by the network device; generating, at the packet processor, a first local-domain timestamp for the timing message, the first local-domain timestamp generated based on a first local-domain clock used by the packet processor; adjusting, at the packet processor, the domain-specific timestamp using the first local-domain timestamp to generate an adjusted domain-specific timestamp; transferring the timing message having the adjusted domain-specific timestamp from the packet processor to a physical layer (PHY) processor of the network device via an internal communication link within the network device; generating, at the PHY processor, a second local-domain timestamp using a second local-domain clock used by the PHY processor, the second local-domain timestamp corresponding to a time at which the PHY processor transmits the timing message via a network link communicatively coupled to the PHY processor and being external to the network device; modifying, at the PHY processor, timing information in the timing message using the second local-domain timestamp, the timing information being separate from the adjusted domain-specific timestamp; and transmitting, by the PHY processor, the timing message via the network link, the timing message including the adjusted domain-specific timestamp and the timing information when transmitted so that the adjusted domain-specific timestamp and the timing information is available to another network device that receives the timing message to use the timing information to further adjust the adjusted domain-specific timestamp to determine a time, measured by the domain-specific clock, at which the PHY processor transmitted the timing message via the network link.

Embodiment 12: The method for timestamping packets of embodiment 11, wherein: adjusting the domain-specific timestamp using the first local-domain timestamp comprises subtracting a value of the first local-domain timestamp from a value of the domain-specific timestamp; and the PHY processor transmits the timing message with the domain-specific timestamp and the timing information so that the adjusted domain-specific timestamp and the timing information is available to another network device that receives the timing message to use the timing information to add to the adjusted domain-specific timestamp to determine the time, measured by the domain-specific clock, at which the PHY processor transmitted the timing message via the network link.

Embodiment 13: The method for timestamping packets of either of embodiments 11 or 12, further comprising: embedding the adjusted domain-specific timestamp in a first field of the timing message prior the timing message being transferred to the PHY processor; and modifying the timing information in the timing message comprises modifying timing information in a second field in the timing message.

Embodiment 14: The method for timestamping packets of embodiment 13, wherein: embedding the adjusted domain-specific timestamp in the first field of the timing message comprises embedding the domain-specific timestamp in a timestamp field in a payload of a precision time protocol (PTP) message; and modifying the timing information in the timing message comprises modifying a value of a correction field in a header of the PTP message.

Embodiment 15: The method for timestamping packets of any of embodiments 11-14, further comprising: synchronizing the first local-domain clock with the second local-domain clock.

Embodiment 16: A network device, comprising a packet processor including a first timestamping engine configured to: generate a domain-specific timestamp for a timing message to be transmitted by the network device, the domain-specific timestamp generated using a domain-specific clock maintained by the network device; generate a first local-domain timestamp for the timing message, the first local-domain timestamp generated based on a first local-domain clock used by the packet processor; and adjust the domain-specific timestamp using the first local-domain timestamp to generate an adjusted domain-specific timestamp. The packet processor is configured to transfer the timing message having the adjusted domain-specific timestamp from the packet processor to a physical layer (PHY) processor of the network device via an internal communication link within the network device. The network device further comprises the PHY processor, which is configured to communicatively couple with one or more network links external to the network device. The PHY processor includes a second timestamping engine that is configured to: generate a second local-domain timestamp using a second local-domain clock used by the PHY processor; and modify timing information in the timing message using the second local-domain timestamp, the timing information being separate from the adjusted domain-specific timestamp. The PHY processor is further configured to transmit the timing message via at least one of the one or more network links, the timing message including the adjusted domain-specific timestamp and the timing information when transmitted so that the adjusted domain-specific timestamp and the timing information is available to another network device that receives the timing message to use the timing information to further adjust the adjusted domain-specific timestamp to determine a time, measured by the domain-specific clock, at which the PHY processor transmitted the timing message via the network link.

Embodiment 17: The network device of embodiment 16, wherein: the first timestamping engine is configured to adjust the domain-specific timestamp at least by subtracting a value of the first local-domain timestamp from a value of the domain-specific timestamp; and the PHY processor is configured to transmit the packet with the adjusted domain-specific timestamp and the timing information so that the adjusted domain-specific timestamp and the timing information is available to another network device that receives the timing message to use the timing information to add to the adjusted domain-specific timestamp to determine the time, measured by the domain-specific clock, at which the PHY processor transmitted the timing message via the network link.

Embodiment 18: The network device of either of embodiments 16 or 17, wherein: the first timestamping engine is configured to embed the adjusted domain-specific timestamp in a first field of the timing message prior the timing message being transferred to the PHY processor; and the second timestamping engine is configured to embed the timing information into a second field in the timing message.

Embodiment 19: The network device of embodiment 18, wherein: the first timestamping engine is configured to embed the adjusted domain-specific timestamp in a timestamp field in a payload of a precision time protocol (PTP) message; and the second timestamping engine is configured to embed the timing information in a correction field in a header of the PTP message.

Embodiment 20: The network device of either of any of embodiments 16-19, wherein: the first local-domain clock is synchronized with the second local-domain clock.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing timing messages communicated in a communication network, the method comprising:
managing, by a first processor of a network device, clock data for a plurality of domain-specific clocks among clocks in the communication network, each domain-specific clock corresponding to a respective synchronized network of clocks in the communication network;
transmitting, by a plurality of physical layer (PHY) second processors of the network device, first packets via a plurality of network links, and receiving, at the plurality of PHY second processors, second packets via the plurality of network links; and
at each of multiple PHY second processors among the plurality of PHY second processors, generating timestamps using one corresponding local clock among one or more local clocks that are unsynchronized with the plurality of domain-specific clocks, the timestamps for at least one of i) first packets a) including timing information based on the plurality of domain-specific clocks and b) corresponding to one or more different domain-specific clocks among the plurality of domain-specific clocks, the timestamps for improving accuracy of the timing information in the first packets, and ii) second packets corresponding to one or more different domain-specific clocks among the plurality of domain-specific clocks, the timestamps for improving accuracy of timing information a) associated with receipt of the second packets by the network device and b) based on the plurality of domain-specific clocks.

2. The method for processing timing messages of claim 1, further comprising, at each of multiple PHY second processors among the plurality of PHY second processors:
   receiving, from the first processor, first packets i) to be transmitted by the PHY second processor and ii) having first timing information corresponding to one or more different domain-specific clocks;
   modifying second timing information in the first packets received by the PHY second processor using timestamps corresponding to the first packets received by the PHY second processor; and
   transmitting the first packets having the first timing information and the second timing information to one or more other network devices via one or more corresponding network links so that the first timing information and the second timing information are available to the one or more other network devices that receive the first packets to determine respective times, measured by one or more corresponding domain-specific clocks, at which the PHY second processor transmitted the first packets.

3. The method for processing timing messages of claim 2, wherein the first timing information corresponding to the one or more different domain-specific clocks includes first timestamps, and wherein the timestamps generated by the PHY second processors are second timestamps, and wherein the method further comprises:
   generating, at the first processor, the first timestamps for the first packets based on the plurality of domain-specific clocks.

4. The method for processing timing messages of claim 3, further comprising:
   adjusting, at the first processor, first timestamps of at least some of the first packets using one of the one or more local clocks that are unsynchronized with the plurality of domain-specific clocks.

5. The method for processing timing messages of claim 4, wherein:
   adjusting the first timestamps of the at least some first packets comprises subtracting respective values of the one local clock from respective values of the first timestamps of the at least some first packets.

6. The method for processing timing messages of claim 3, further comprising:
   embedding, at the first processor, first timestamps in respective first fields of the first packets,
   wherein modifying the second timing information in the first packets comprises modifying respective values of respective second fields of the first packets.

7. The method for processing timing messages of claim 6, wherein:
   embedding the first timestamps in the respective first fields of the first packets comprises embedding the first timestamps in respective timestamp fields in respective payloads of precision time protocol (PTP) messages; and
   modifying the second timing information in the first packets comprises modifying respective values of respective correction fields in respective headers of the PTP messages.

8. The method for processing timing messages of claim 1, further comprising:
   determining, at the first processor, delay values using timestamps corresponding to second packets received from the multiple PHY second processors, the delay values indicating respective transfer times of respective second packets from the multiple PHY second processors to the first processor; and
   using, at the first processor, the delay values to improve accuracy of timing information i) based on one or more domain-specific clocks and ii) corresponding to the second packets received from the multiple PHY second processors.

9. The method for processing timing messages of claim 8, wherein determining the delay values comprises:
   determining respective times at which the second packets are received at the first processor, the respective times determined using one of the one or more local clocks that are unsynchronized with the plurality of domain-specific clocks; and
   determining the delay values further using the respective times at which the second packets are received at the first processor.

10. The method for processing timing messages of claim 8, wherein the timing information corresponding to the one or more different domain-specific clocks includes first timestamps, and wherein the timestamps generated by the PHY second processors are second timestamps, and wherein the method further comprises:
   generating, at the first processor, the first timestamps for the second packets based on the plurality of domain-specific clocks, the first timestamps corresponding to receipt of the second packets by the first processor.

11. The method for processing timing messages of claim 10, wherein using the delay values to improve accuracy of the first timestamps comprises:
   subtracting the delay values from respective first timestamps.

12. The method for processing timing messages of claim 1, further comprising, for each of at least some of the second packets:
   using, at the first processor, i) the timing information a) associated with receipt of the second packets by the network device and b) based on the plurality of domain-specific clocks, and ii) information corresponding to the timestamp to determine a delay from when another network device transmitted the second packet until the second packet was received by the network device.

13. The method for processing timing messages of claim 1, further comprising:
   maintaining, by the first processor of a network device, the plurality of domain-specific clocks, the maintaining of the plurality of domain-specific clocks including the managing of the clock data indicative of the plurality of domain-specific clocks.

14. A network device, comprising:
   one or more local clocks;
   a first processor configured to manage clock data indicative of a plurality of domain-specific clocks, each domain-specific clock corresponding to a respective synchronized network of clocks in a communication network; and
   a plurality of physical layer (PHY) second processors coupled to i) the first processor and ii) a plurality of network links, the plurality of PHY second processors configured to i) transmit first packets via the plurality of network links, and ii) receive second packets via the plurality of network links, each of multiple PHY second processors among the plurality of PHY second processors including one or more respective timestamping engines configured to:
generate timestamps using one corresponding local clock among the one or more local clocks, the timestamps for at least one of i) first packets a) including timing information based on the plurality of domain-specific clocks and b) corresponding to one or more different domain-specific clocks among the plurality of domain-specific clocks, the timestamps for improving accuracy of the timing information in the first packets, and ii) second packets corresponding to one or more different domain-specific clocks among the plurality of domain-specific clocks, the timestamps for improving accuracy of timing information a) associated with receipt of the second packets by the network device and b) based on the plurality of domain-specific clocks.

15. The network device of claim 14, wherein, for each of multiple PHY second processors among the plurality of PHY second processors:
the PHY second processor is configured to receive, from the first processor, first packets i) to be transmitted by the PHY second processor and ii) having first timing information corresponding to one or more different domain-specific clocks;
a timestamping engine of the PHY second processor is configured to modify second timing information in the first packets received by the PHY second processor using timestamps corresponding to the first packets received by the PHY second processor; and
the PHY second processor is further configured to transmit the first packets having the first timing information and the second timing information to one or more other network devices via one or more corresponding network links so that the first timing information and the second timing information are available to the one or more other network devices that receive the first packets to determine respective times, measured by one or more corresponding domain-specific clocks, at which the PHY second processor transmitted the first packets.

16. The network device of claim 15, wherein the first timing information corresponding to the one or more different domain-specific clocks includes first timestamps, wherein the second timing information comprises second timestamps, and wherein:
the first processor includes a first timestamping engine configured to generate the first timestamps for the first packets based on the plurality of domain-specific clocks; and
the timestamping engines of the plurality of PHY second processors include second timestamping engines configured to generate the second timestamps.

17. The network device of claim 16, wherein the first processor further comprises:
calculator circuitry configured to adjust first timestamps of at least some of the first packets using one of the one or more local clocks that is unsynchronized with the plurality of domain-specific clocks.

18. The network device of claim 17, wherein the calculator circuitry is configured to:
adjust the first timestamps of the at least some first packets at least by subtracting respective values of the one local clock from respective values of the first timestamps of the at least some first packets.

19. The network device of claim 16, wherein:
the first timestamping engine of the first processor is configured to embed first timestamps in respective first fields of the first packets; and
for each of multiple PHY second processors among the plurality of PHY second processors, the second timestamping engine is configured to modify respective values of respective second fields of the first packets.

20. The network device of claim 19, wherein:
the first timestamping engine of the first processor is configured to embed the first timestamps in respective timestamp fields in respective payloads of precision time protocol (PTP) messages; and
for each of multiple PHY second processors among the plurality of PHY second processors, the second timestamping engine is configured to modify the timing information in the first packets at least by modifying respective values of respective correction fields in respective headers of the PTP messages.

21. The network device of claim 14, wherein the first processor is configured to:
determine delay values using timestamps corresponding to second packets received from the multiple PHY second processors, the delay values indicating respective transfer times of respective second packets from the multiple PHY second processors to the first processor; and
use the delay values to improve accuracy of timing information i) based on one or more domain-specific clocks and ii) corresponding to the second packets received from the multiple PHY second processors.

22. The network device of claim 21, wherein the first processor is configured to determine the delay values at least by:
determining respective times at which the second packets are received at the first processor, the respective times determined using one of the one or more local clocks that is unsynchronized with the plurality of domain-specific clocks; and
determining the delay values further using the respective times at which the second packets are received at the first processor.

23. The network device of claim 22, wherein the first timing information corresponding to the one or more different domain-specific clocks includes first timestamps, and wherein the timestamps generated by the PHY second processors are second timestamps, and wherein:
the first processor includes a first timestamping engine configured to generate the first timestamps for the second packets based on the plurality of domain-specific clocks, the first timestamps corresponding to receipt of the second packets by the first processor; and
the timestamping engines of the plurality of PHY second processors include second timestamping engines configured to generate the second timestamps.

24. The network device of claim 23, wherein the first processor is configured to use the delay values to improve accuracy of the first timestamps at least by:
subtracting the delay values from respective first timestamps.

25. The network device of claim 23, wherein the first processor is configured to, for each of at least some of the second packets:
use the first timestamp and timing information corresponding to the second packet to determine a delay from when another network device transmitted the second packet until the second packet was received by the network device.

26. The network device of claim 14, further comprising: the plurality of domain-specific clocks, wherein the first processor is configured to maintain the plurality of domain-specific clocks based on managing the clock data indicative of the plurality of domain-specific clocks.

* * * * *